(12) United States Patent
Kameyama

(10) Patent No.: US 7,767,896 B2
(45) Date of Patent: Aug. 3, 2010

(54) VEHICULAR MUSIC REPLAY SYSTEM

(75) Inventor: Shogo Kameyama, Chiryu (JP)

(73) Assignee: Denso Corporation, Kariya (JP)

(*) Notice: Subject to any disclaimer, the term of this patent is extended or adjusted under 35 U.S.C. 154(b) by 247 days.

(21) Appl. No.: 12/183,446

(22) Filed: Jul. 31, 2008

(65) Prior Publication Data

US 2009/0076637 A1 Mar. 19, 2009

(30) Foreign Application Priority Data

Sep. 14, 2007 (JP) ............................ 2007-239689

(51) Int. Cl.
*G10H 1/00* (2006.01)
(52) U.S. Cl. .............................. 84/600; 700/94; 381/86
(58) Field of Classification Search ........... 84/600–602; 700/94; 381/86
See application file for complete search history.

(56) References Cited

U.S. PATENT DOCUMENTS

| | | | | |
|---|---|---|---|---|
| 4,776,323 | A * | 10/1988 | Spector | 601/23 |
| 7,567,847 | B2 * | 7/2009 | Basson et al. | 700/94 |
| 7,683,252 | B2 * | 3/2010 | Oliver et al. | 84/612 |
| 7,696,427 | B2 * | 4/2010 | West et al. | 84/615 |
| 2004/0055443 | A1 * | 3/2004 | Nishitani et al. | 84/603 |
| 2005/0098023 | A1 * | 5/2005 | Toivonen et al. | 84/615 |
| 2006/0167576 | A1 * | 7/2006 | Rosenberg | 700/94 |
| 2006/0185502 | A1 * | 8/2006 | Nishitani et al. | 84/615 |
| 2006/0235753 | A1 | 10/2006 | Kameyama | |
| 2007/0028749 | A1 * | 2/2007 | Basson et al. | 84/601 |
| 2007/0065121 | A1 * | 3/2007 | Saito | 386/126 |
| 2007/0113725 | A1 * | 5/2007 | Oliver et al. | 84/612 |
| 2007/0113726 | A1 * | 5/2007 | Oliver et al. | 84/615 |
| 2007/0147802 | A1 * | 6/2007 | Nomura | 386/126 |
| 2008/0119994 | A1 | 5/2008 | Kameyama | |
| 2008/0133441 | A1 * | 6/2008 | West et al. | 706/46 |
| 2008/0189319 | A1 * | 8/2008 | Nielen et al. | 707/102 |
| 2009/0076637 | A1 * | 3/2009 | Kameyama | 700/94 |
| 2009/0210080 | A1 * | 8/2009 | Basson et al. | 700/94 |

(Continued)

FOREIGN PATENT DOCUMENTS

JP 09-245049 9/1997

(Continued)

OTHER PUBLICATIONS

U.S. Appl. No. 12/173,500 of Kameyama, filed Jul. 15, 2008.

(Continued)

*Primary Examiner*—David S. Warren
(74) *Attorney, Agent, or Firm*—Nixon & Vanderhye PC

(57) ABSTRACT

There is a need for providing a vehicular music replay system that can allow a car user to select a music source appropriate to the user's character or biological condition even from genres unknown to the user, allow even a first music source to be felt suited for the user, and consequently enhance an emotion about encounter with an unknown music source. The system stores music sources to be replayed in music source databases in association with applicable user state data reflecting a user state containing at least one of a user character, mental condition, and physical condition. The system retrieves a music source corresponding to the current user state acquired in a car. During the retrieval, a higher retrieval priority is provided for a music source having a lower replay history in the past.

13 Claims, 10 Drawing Sheets

U.S. PATENT DOCUMENTS

| | | | |
|---|---|---|---|
| 2009/0240358 A1* | 9/2009 | Ogasawara et al. | 700/94 |
| 2009/0249945 A1* | 10/2009 | Yamashita et al. | 84/612 |
| 2010/0094866 A1* | 4/2010 | Cuttner et al. | 707/723 |

FOREIGN PATENT DOCUMENTS

| | | |
|---|---|---|
| JP | 2001-306913 | 11/2001 |
| JP | 2002-015078 | 1/2002 |
| JP | 2002-207764 | 7/2002 |
| JP | 2002-230316 | 8/2002 |
| JP | 2003-195864 | 7/2003 |
| JP | 2005-173938 | 6/2005 |
| JP | 2005-209276 | 8/2005 |
| JP | 2005-316943 | 11/2005 |
| JP | 2006-092430 | 4/2006 |
| JP | 2006-155157 | 6/2006 |
| JP | 2006-190367 | 7/2006 |
| JP | 2006-196048 | 7/2006 |
| JP | 2006-282111 | 10/2006 |
| JP | 2006-294212 | 10/2006 |
| JP | 2006-331598 | 12/2006 |
| JP | 2007-099249 | 4/2007 |
| JP | 2007-145225 | 6/2007 |

OTHER PUBLICATIONS

Japanese Office Action dated Sep. 10, 2009, issued in corresponding Japanese Application No. 2007-239689, with English translation.

* cited by examiner

FIG. 4

| SONG ID 1 | SONG NAME 1 | RELEASE YEAR 1 | GENRE CODE 1 | SONG MODE 1 | AGE CODE 1 | CHARACTER CODE 1 | SEX CODE 1 | APPLI. BIOLOG. CON. $\varepsilon_1$ | SONG DATA 1 |
|---|---|---|---|---|---|---|---|---|---|
| SONG ID 2 | SONG NAME 2 | RELEASE YEAR 2 | GENRE CODE 2 | SONG MODE 2 | AGE CODE 2 | CHARACTER CODE 2 | SEX CODE 2 | APPLI. BIOLOG. CON. $\varepsilon_2$ | SONG DATA 2 |
| SONG ID 3 | SONG NAME 3 | RELEASE YEAR 3 | GENRE CODE 3 | SONG MODE 3 | AGE CODE 3 | CHARACTER CODE 3 | SEX CODE 3 | APPLI. BIOLOG. CON. $\varepsilon_3$ | SONG DATA 3 |
| SONG ID 4 | SONG NAME 4 | RELEASE YEAR 4 | GENRE CODE 4 | SONG MODE 4 | AGE CODE 4 | CHARACTER CODE 4 | SEX CODE 4 | APPLI. BIOLOG. CON. $\varepsilon_4$ | SONG DATA 4 |

(201)

CHARACTER CODE (SKC)

SKC1: ACTIVE
SKC2: GENTLE
SKC3: OPTIMISTIC
SKC4: PESSIMISTIC
SKC5: DECADENT
SKC6: PHYSICAL
SKC7: INTELLIGENT
SKC8: ROMANTICIST

GENRE CODE (JC)

JC1: CLASSIC
JC2: JAZZ
JC3: ROCK
JC4: POPS
JC5: JAPANESE MUSIC
JC6: WORLD MUSIC
JC7: MOOD

AGE CODE (AC)

AC1: INFANT (TO 5 YEARS)
AC2: CHILD (6 TO 11)
AC3: JUNIOR (12 TO 17)
AC4: YOUTH (18 TO 27)
AC5: MIDDLE AGE (28 TO 37)
AC6: SENIOR (38 TO 45)
AC7: MATURE AGE (46 TO 63)
AC8: OLD AGE (64 TO OVER)
AC9: REGARDLESS OF AGE

SEX CODE (SC)

SC1: MALE
SC2: FEMALE
SC3: REGARDLESS OF SEX

SONG MODE

AG: UPLIFTING, ACTIVATING
ST: REFRESHING
SF: MILD, SOOTHING
HL: HEALING, $\alpha$-WAVE

FIG. 5

| DATE | USER NAME | SONG ID | 202A |
|---|---|---|---|
| DATE 1 | AY | ID301 | RD1 |
| DATE 2 | BX | ID211 | RD2 |
| DATE 3 | CZ | ID33 | RD3 |
| ⋮ | ⋮ | ⋮ | ⋮ |

FIG. 6

CHARACTER TYPE D    STATE ε                              202B

| ID | TITLE | DEGREE OF CONFORMITY | RELEASE YEAR | MUSIC SELECTION HISTORY BY USER BX |
|---|---|---|---|---|
| ID 1 | SONG 1 | 10 | SECOND 2007 | ○ |
| ID 2 | SONG 2 | 10 | SECOND 2007 | × |
| ID 3 | SONG 3 | 9 | FIRST 2007 | △ |
| ID 4 | SONG 4 | 9 | FIRST 2007 | △ |
| ID 5 | SONG 5 | 8 | SECOND 2006 | × |
| ID 6 | SONG 6 | 8 | SECOND 2006 | ○ |
| ID 7 | SONG 7 | 10 | SECOND 2005 | × |
| ID 8 | SONG 8 | 10 | SECOND 2005 | × |
| ID 9 | SONG 9 | 9 | FIRST 2005 | ○ |
| ID 10 | SONG 10 | 8 | SECOND 2004 | × |
| ID 11 | SONG 11 | 8 | SECOND 2004 | ○ |
| ⋮ | ⋮ | ⋮ | ⋮ | ⋮ |

○ : THREE TIMES OR MORE
△ : ONCE OR TWICE
× : NONE

FIG. 7A

| BIOLOGICAL PARAMETER<br>STATE TO BE SPECIFIED | BLOOD PRESSURE CHANGE | BLOOD PRESSURE DIREC. | BODY TEMP. CHANGE | BODY TEMP. DIREC. | SKIN RESISTANCE CHANGE | SKIN RESISTANCE DIREC. | EXPRESSION MEANING | EXPRESSION CHANGE | ATTITUDE MOVE | ATTITUDE SPEED |
|---|---|---|---|---|---|---|---|---|---|---|
| NORMAL α | — | — | — | — | — | — | | — | — | — |
| DISTRACTED β | FAST | VARYING | — | — | FAST | INCR. | FACE DIREC. | SUDDEN INCR. | INCR. AND DECR. | — |
| SLIGHTLY UNWELL OR UNPLEASANT γ | SLOW | — | SLOW | — | — | — | UNPLEASANT | SLIGHT INCR. | SLIGHT INCR. | — |
| SERIOUSLY UNWELL δ | SLOW | — | SLOW | — | SLOW | INCR. | UNPLEASANT | INCR. | INCR. AND DECR. | DECR. |
| EXCITED ε | FAST | VARYING | FAST | VARYING | FAST | DECR. | EXCITED | SUDDEN INCR. | SUDDEN INCR. | INCR. |
| SLIGHTLY UNWELL AND DISTRACTED ζ | FAST | VARYING | SLOW | — | FAST | INCR. | FACE DIREC. OR UNPLEASANT | INCR. | INCR. AND DECR. | — |
| DISTRACTED AND SERIOUSLY UNWELL η | FAST | VARYING | SLOW | — | SLOW | INCR. | UNPLEASANT | INCR. | INCR. AND DECR. | DECR. |
| SLIGHTLY UNWELL AND EXCITED ι | FAST | — | FAST | — | FAST | DECR. | EXCITED | SUDDEN INCR. | SUDDEN INCR. | INCR. |
| DISAPPOINTED (DEPRESSED) AND DISTRACTED κ | — | — | SLOW | — | SLOW | INCR. | NO EXPRESSION OR UNPLEASANT | SLIGHT INCR. | — | — |

A DASH "—" DENOTES A NORMAL STATE.

FIG. 7B

| LINE OF SIGHT | | | PUPIL | STEERING | | PHYSICAL INDEX | MENTAL INDEX | COLLATION COUNTER |
| --- | --- | --- | --- | --- | --- | --- | --- | --- |
| MOVE | SPEED | PATTERN | DIAMETER | ERROR | SPEED | PL | SL | MATCHING COUNT |
| — | — | — | — | — | — | 10 | 5 | $N_0$ |
| SUDDEN INCR. | — | MODULATION | VARYING | INCR. | — | 8 | 3 | $N_1$ |
| DECR. | SUDDEN DECR. | MODULATION | — | — | — | 6 | 4 | $N_2$ |
| SUDDEN DECR. | SUDDEN INCR. | MODULATION | OPENED | INCR. | DECR. | 0 | 2 | $N_3$ |
| SUDDEN DECR. | SUDDEN DECR. | MODULATION | VARYING | INCR. | INCR. | 10 | 10 | $N_4$ |
| SUDDEN INCR. | — | MODULATION | VARYING | INCR. | — | 7 | 3 | $N_5$ |
| SUDDEN DECR. | SUDDEN DECR. | MODULATION | OPENED | INCR. | DECR. | 0 | 1 | $N_6$ |
| SUDDEN DECR. | SUDDEN INCR. | MODULATION | — | INCR. | INCR. | 8 | 10 | $N_7$ |
| DECR. | — | — | — | INCR. | — | 6 | 0 | $N_8$ |

1601

VEHICULAR MUSIC REPLAY SYSTEM

CROSS REFERENCE TO RELATED APPLICATION

This application is based on and incorporates herein by reference Japanese Patent Application No. 2007-239689 filed on Sep. 14, 2007.

FIELD OF THE INVENTION

The invention relates to a vehicular music replay system.

BACKGROUND OF THE INVENTION

Patent Documents 1 through 3 disclose the technologies that download music source data from an information provision center outside a vehicle by means of telecommunication to enhance an onboard music database including a hard disk unit and the like. Patent Documents 4 through 7 disclose the technologies that specify a physical condition, a mental condition, or a character of a driver, reads and plays music source data appropriate to the driver state for entertaining the driver during driving, stabilizing the physical condition or the mental condition, and contributing toward realizing more comfortable driving.

According to the technologies of downloading a new music source (or a piece of music) as disclosed in Patent Documents 1 through 3, a user needs to search for an intended music source and download it using known information such as a song name or a favorite player name as a clue. When the user has listened to a given music selection once or more, the music selection may suite tastes of the user but may not provide unpredictability of selecting music source. An impression resulting from listening to that music source may be predictable. The music source may be unimpressionable. On the other hand, an unknown music source may be emotional when it is downloaded based on a singer, a performer, or a composer and happens to suite tastes of the user. However, the music source may not suite tastes of the user and may be disappointing. Such a hit-or-miss method may waste download costs.

Patent Documents 4 through 7 disclose the technologies of selecting music sources in accordance with a mental condition or the like of the user. The technologies can select appropriate music sources when analyzing conformity to the user's mental condition by playing the same music source repeatedly. When the user's mental condition can be identified, most of the appropriately retrieved music sources are already known to the user. It is difficult to expect an emotion from the encounter with an unknown music source.

Patent Document 1: JP-2001-306913 A
Patent Document 2: JP-2002-230316 A
Patent Document 3: JP-2003-195864 A
Patent Document 4: JP-2006-282111 A
Patent Document 5: JP-2006-155157 A
Patent Document 6: JP-2007-145225 A
Patent Document 7: JP-2007-099249 A

SUMMARY OF THE INVENTION

It is an object of the present invention to provide a vehicular music replay system that can allow a car user to select a music source appropriate to the user's character or biological condition even from genres unknown to the user, allow even a first or unfamiliar music source or music selection to be felt suited for the user, and consequently enhance an emotion about encounter with an unknown music source.

According to an example of the present invention, a vehicular music replay system is provided as follows. A music replay and output mean included in a vehicle for replaying music or a music source based on selected music source data. A storage medium is included to have a music source database for storing the music source data individually in association with applicable user state data reflecting a user state containing at least a user character, a mental condition, and a physical condition applicable to a music content replayed by each music source data. A music replay history recording means is included for recording a replay history of each of the music source data. A user state specification means is included for specifying a current user state of the user in the vehicle. An unfamiliar source retrieval means is included for searching the music source database for music source data provided with applicable user state data corresponding to the specified user state so as to provide a higher retrieval priority for a lower replay history by referencing the replay history. An unfamiliar source replay control means is included for selecting music source data to be replayed from the music source database based on a retrieval result by the unfamiliar source retrieval means and allowing the music replay and output means to replay the selected music source data.

According to another example of the present invention, a method for replaying music in a vehicle is provided by comprising: (i) storing music source data including a plurality of music sources, each music source being in association with applicable user state data reflecting a user state containing at least a user character, a mental condition, and a physical condition applicable to a music content replayed by the each music source; (ii) recording a replay history of each of the music sources; (iii) specifying a current user state of the user in the vehicle; (iv) searching the music source database for a music source provided with applicable user state data corresponding to the specified user state so as to provide a higher retrieval priority for a lower replay history by referencing the replay history; (v) selecting a music source to be replayed from the music source database based on a result from the searching the music source database; and (vi) replaying the selected music source.

BRIEF DESCRIPTION OF THE DRAWINGS

The above and other objects, features, and advantages of the present invention will become more apparent from the following detailed description made with reference to the accompanying drawings. In the drawings:

FIG. 4 shows an example of a music source database;

FIG. 5 shows an example of storing raw data in a music replay history database;

FIG. 6 shows a result of user-based music selection and degrees of conformity in a music replay history database;

FIG. 7 schematically shows an example of a diagram for determination of biological conditions;

DETAILED DESCRIPTION OF THE PREFERRED EMBODIMENTS

Figure 1:
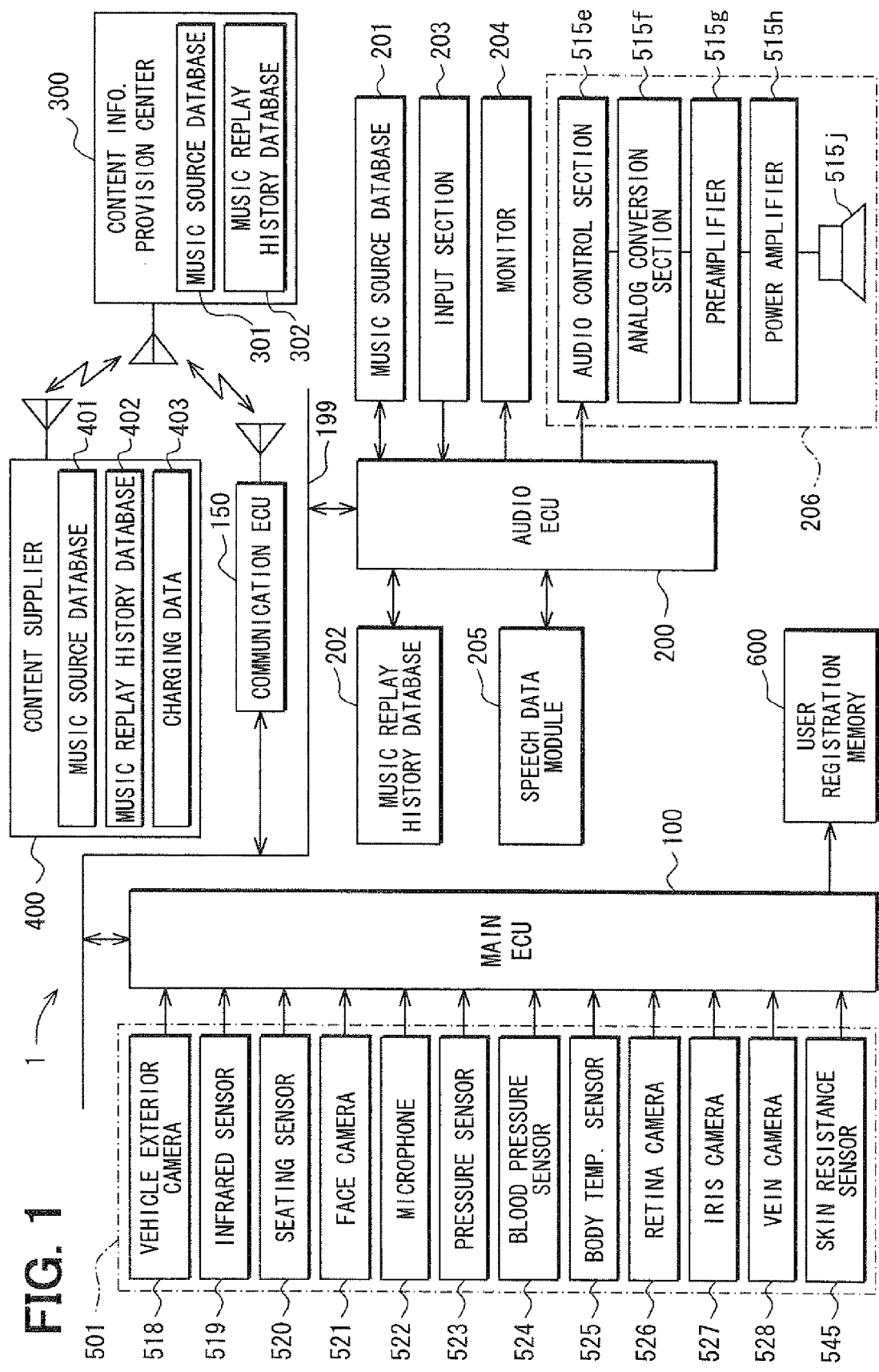
FIG. 1 is a block diagram showing an example of an electric structure of a vehicular music replay system according to an embodiment of the present invention.

Embodiments of the present invention will be described in further detail with reference to the accompanying drawings. FIG. 1 is a block diagram showing an overall construction of a vehicular music replay system 1 as an embodiment of the invention. The vehicular music replay system 1, which is mounted in a vehicle including a car, chiefly includes a main ECU (Electronic Control Unit) 100 and an audio ECU 200 each of which is provided as a microprocessor. The main ECU 100 connects with a biological information acquisition unit 501. Each biological information acquisition unit 501 includes the following sensors.

Exterior camera 518: This camera captures a user approaching a car.

Infrared sensor 519: This sensor produces a thermogram based on infrared rays radiated from a face of a user getting into a car. The infrared sensor 519 functions as a body temperature measuring section. The infrared sensor 519 can estimate the user's biological condition (physical condition or mental condition) by measuring chronologically varying waveforms.

Seating sensor 520: This sensor detects whether or not the user sits on a seat. The seating sensor 520 can include a proximity switch embedded in a car seat.

Face camera 521: This camera captures the face of the user sitting on the seat. The face camera 521 is mounted to, e.g., a rearview mirror (called a back mirror), and takes a bust of the user (driver) who has been seated on the seat, including the face, from diagonally above along a view line from a windshield (called a front screen). An image of the face portion is extracted from the taken image. Various facial expressions of the user can be specified in comparison with prepared master images that are generated by previously photographing various expressions of the user. The facial expressions are ranked in order of good physical and mental conditions. The facial expressions are provided with points in the order (for example, in case of the mental condition, stability is "1," distraction and anxiety are "2," excitation and anger are "3"). The facial expressions can be used as discrete numeral parameters. The time change of the facial expressions can be measured as discrete waveforms. The biological condition can be estimated based on the waveforms. The face camera 521 is also used for user authentication by use of biometrics. The face camera 521 can magnify and detect a direction of an iris of an eye to specify a direction of the face or eye (for example, when the user sees a watch frequently, the user is estimated to be upset about time). In accordance with time change waveform of an angle of the eye direction (a direction when the user faces a just front is defined as a standard direction, an angle of the shift to right and left relative to the standard direction is detected as a change of the waveform), the face camera 521 is also used for estimating the biological condition of the driver.

Microphone 522: This microphone detects a voice of the user.

Pressure sensor 523: This sensor is mounted to a position grasped by the user, such as a steering wheel or shift lever, and detects a grip of the user and a repeating frequency of the gripping and releasing.

Blood pressure sensor 524: This sensor is mounted to a user-grasped position of the steering wheel of the vehicle. A time change of a value of a blood pressure detected by a blood pressure sensor 524 is recorded as a waveform. In accordance with the waveform, the pressure sensor 523 is used for estimating the physical and mental condition of the driver.

Body temperature sensor 525: This sensor includes a temperature sensor mounted to a user-grasped position of the steering wheel of the vehicle. A time change of a temperature detected by the body temperature sensor 525 is recorded as a waveform. The body temperature sensor 525 is used for estimating the biological condition of the user in accordance with the waveform.

Skin resistance sensor 545: This is a known sensor for measuring a resistance value of the surface of a body due to sweat and is mounted to a user-grasped position of the steering wheel of the vehicle. A time change of a skin resistance value detected by the skin resistance sensor 545 is recorded as a waveform. The skin resistance sensor 545 is used for estimating the biological condition of the driver in accordance with the waveform.

Retina camera 526: This camera takes a retina pattern of the user. The retina pattern is used for a user authentication by use of biometrics.

Iris camera 527: This camera is mounted to, e.g., a back mirror, and takes an image of an iris of the user. The iris image is used for a user authentication by use of biometrics. When an image of the iris is used, characteristics of a pattern and color of the iris is used for the verification and authentication. In accordance with a time change of a size of a pupil of the driver taken by the iris camera, the biological condition can be estimated.

Vein camera 528: This camera takes a vein pattern of the user, which is used for the user identification by use of biometrics.

The audio ECU 200 connects with a music source database 201, a music replay history database 202, an input section 203, a monitor 204, a speech database module 205, and an audio hardware 206. Herein, each database is stored in an appropriate storage medium, The music source database 201 stores many pieces of music source data. Herein, music source data signify data on music sources; a music source includes a piece of music, a song, a music selection, or the like. The music replay history database 202 records a replay history of music source data in accordance with user states. The music replay history database 202 and the music source database 201 form a car database. The input section 203 is used for selecting music sources. The monitor 204 displays a music selection result or a result of retrieving unexperienced contents. The speech database module 205 is used for audibly generating guide information associated with replay of unexperienced contents. The audio hardware (music replay and output means) 206 replays digital music based on the music source data.

The audio hardware 206 includes a digital audio control section 515e. The music source data is read from the music source database 201 and is transmitted to the audio control section 515e. The audio control section 515e decodes the music source data into digital music waveform data. An analog conversion section 515f converts the data into analog data. The analog data passes through a preamplifier 515g and a power amplifier 515h and is output from a speaker 515j in accordance with a volume specified by music playing control information for hospitality.

The main ECU 100 and the audio ECU 200 are connected via a communication bus 199. The communication bus 199 connects with a communication ECU 150 that wirelessly communicates with a server outside the vehicle. Specifically, the server is provided as a music source data server at a content information provision center 300. The server includes a database 301 and a music replay history database 302. Herein, each database is stored in an appropriate storage medium. The database 301 wirelessly delivers music source data to the vehicular music replay system 1 for each of contracted cars via the communication ECU 150. The music replay history database 302 stores music replay history data transmitted as a feedback from the vehicular music replay system 1 of each car through the wireless communication via the communication ECU 150. The music source database 301 and the music replay history database 302 form a distributor database.

The content information provision center 300 is also capable of wireless communication with a music source data server for a content supplier 400. The server includes a database 401 and a music replay history database 402. The database 401 stores music source data to be newly released to the content information provision center 300 for profit. The music replay history database 402 stores music replay history data about various users purchased via the content information provision center 300. The content supplier 400 is also provided with a charging data storage section 403 that records charging data resulting from delivery of music source data and purchase of replay history data.

Figure 2:
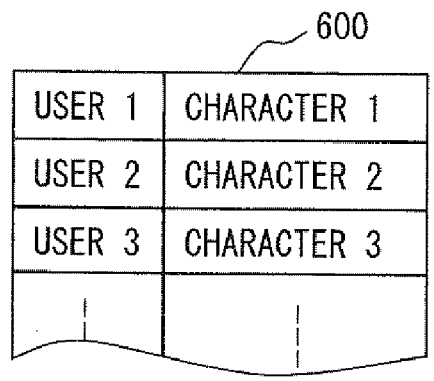
FIG. 2 shows the concept of a user registration portion.

The main ECU 100 is provided with user registration memory 600 for previously storing multiple car users. The user registration memory 600 registers a user name (or user ID) and a corresponding character type (see FIG. 2) in association with each other. The character type is acquired and accumulated as operation history information about a specific operation section while the user continues using the car. The character type can be also estimated based on the accumulated operation history information. However, the operation history information may not be sufficiently stored immediately after starting using the car. Alternatively, there may be a need to estimate a character type without collecting the operation history information intentionally. In such cases, as described below, the user can enter character type information or information needed to specify the character type information. The character type can be determined based on the input result.

Figure 3:
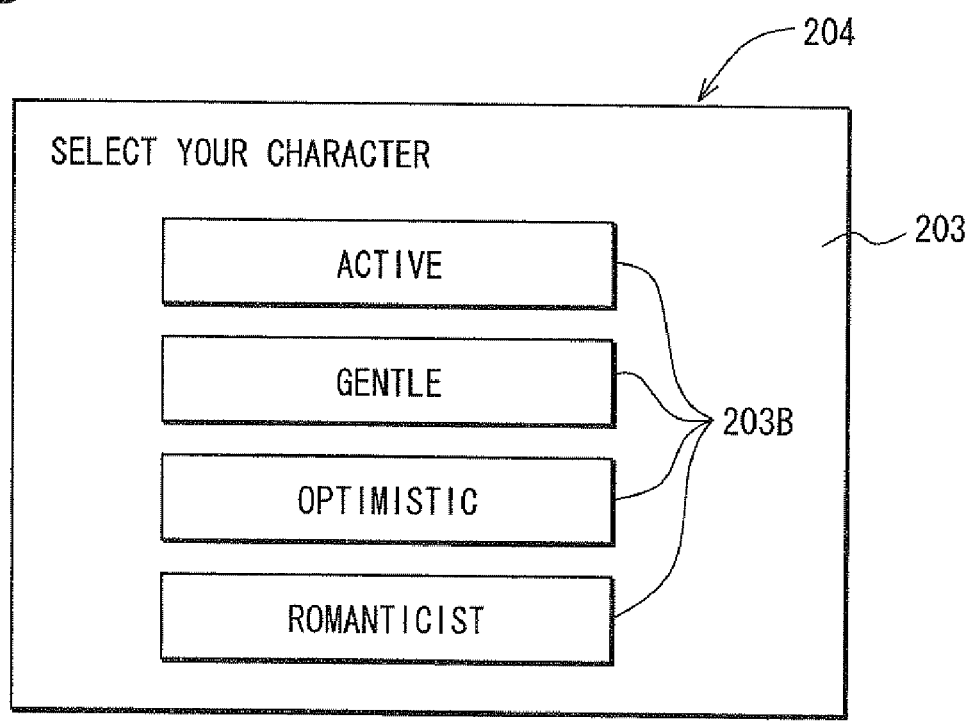
FIG. 3 schematically shows an example of a character input interface.

As shown in FIG. 3, the monitor 204 in FIG. 1 displays a character type (by exchanging information with the main ECU 100 via the communication bus 199). The user selects an appropriate character type and inputs it from the input section 203. The input section 203 is a touch panel attached to the monitor 204. The user touches a displayed selection software button 203B for selection and input. Instead of directly inputting a character type, a questionnaire may be used for determining the character type. In this case, the monitor 204 displays questions for the questionnaire. The user chooses from the questions. Answering all the questions can uniquely determine one of a group of character types predetermined for combinations of questions. The input section 203 is also used for the user registration including the user name. The user registration memory 600 stores the user registration as well as the determined character type.

FIG. 4 shows an example of the music source database 201. The music source database 201 stores music source data (such as MPEG audio stream data) in association with song specification data such as song IDs, song names, and release years. Each music source data stores song selection category data such as a genre code, a song mode code, a sex code ("male," "female," and "regardless of sex"), a character type code indicating a character type (e.g., "active," "gentle," "optimistic," "pessimistic," "decadent," "physical," "intelligent," or "romanticist") estimated for the user selecting the music source, an age code indicating a user age appropriate for the song (e.g., "infant," "child," "junior," "youth," "middle age," "senior," "mature age," "old," or "regardless of age"), and an applicable biological condition ϵ defined by a method to be described later in association with each other. The character type code and the applicable biological condition ϵ construct applicable user state data. The song mode code shows relationship between the song and the mental or physical condition of the user who has selected the song. In this embodiment, the song mode codes are classified into "uplifting," "refreshing," "mild and soothing," "healing and αwave," and so on.

As shown in FIG. 5, the music replay history database 202 stores raw data 202A that contains a replay date, user name, song ID, and song selection reference data RD in association with each other. As shown in FIG. 6, the raw data is used to create and store user-based replay history data 202B. Specifically, the replay history about each user is collected and recorded in accordance with contents of applicable user state data contained in the song selection reference data RD. The music replay history database 202 also stores a degree of conformity associated with a conforming user state for a replayed music source. The degree of conformity is evaluated and provided by a method (to be described) for each of music sources.

The character type code is unique to each user. However, biological conditions of the user may vary while the music is replayed. In FIG. 6, the replay history is collected in accordance with contents of the applicable biological condition ϵ. The replay history may be collected at a time based on each character type, not on the applicable biological condition.

Figure 8:
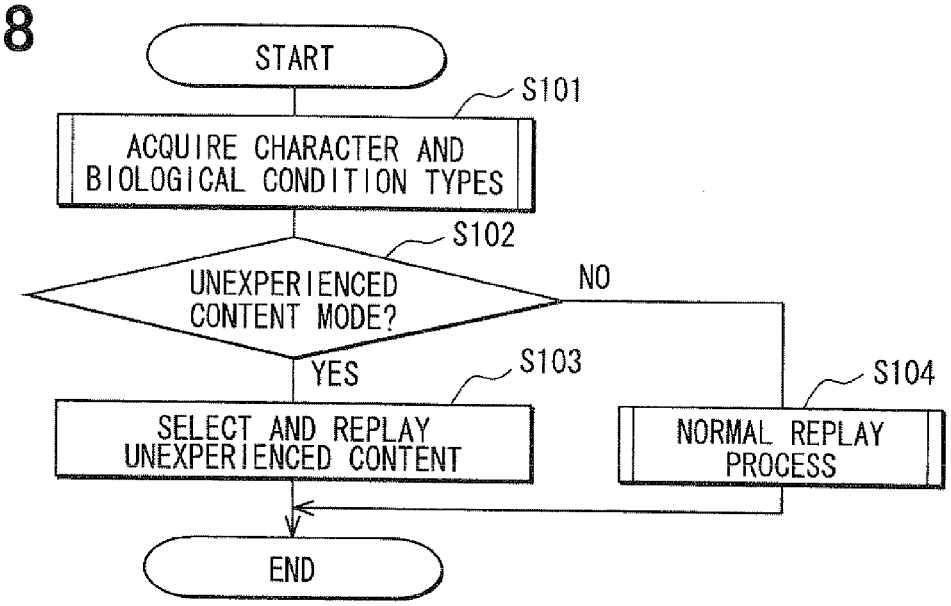
FIG. 8 is a flow chart showing a first example of an operation process of the vehicular music replay system in FIG. 1.

The following describes operations of the vehicular music replay system 1 using a flow chart, First, a known method is used to authenticate and specify a user getting into the car. For example, the method is based on ID or password authentication using an ID card individually supplied to each user or on biometric authentication using information about a face, fingerprint, palm, speech, iris, and retina. At S101 in FIG. 8, the system specifies a character and a biological condition of the user. The system can specify the character by accessing the user registration memory 600 in FIG. 2.

The process of specifying biological conditions (mental and physical states) is disclosed in Patent Documents 4 through 7 in detail and only the outline is described here. Basically, the process uses the system that measures chronological changes of acquired biological condition parameters and estimates a biological condition according to a varying waveform. When "expressions" is used as a biological condition parameter, the system uses the face camera 521 in FIG. 1. The system captures face images at a specified sampling interval and compares the captured images with master images to identify expression types such as "stability," "distraction and anxiety," and "excitation and anger." The system determines the chronological change to be "small," "large," "slightly large," or "very large."

When "body temperatures" is used as a biological condition parameter, the system uses the body temperature sensor 525 (infrared sensor 519). Specifically, the system samples body temperatures detected at sampling timings based on a specified time interval and records the body temperatures as a waveform. The system applies a known fast Fourier transform to the waveform to find a frequency spectrum. The system computes a center frequency or a peak frequency f of the spectrum. The system divides the waveform into the specified number of sections and computes an average body temperature for the sections. The system computes an integral amplitude for each section using the average body temperature as a center line of the waveform. The system averages integral amplitudes for the sections to determine a representative value for the waveform amplitudes. The system checks whether or not a determined frequency f is larger than a upper bound threshold value fu0. When the determined frequency f is larger than the upper bound threshold value fu0, the system determines that a change in the body temperature under monitoring is "sudden." The system checks whether or not the frequency f is larger than a lower bound threshold value fL0 (>fu0). When the frequency f is larger than the lower bound threshold value fL0, the system determines that a change in the body temperature under monitoring is "slow." Under the condition of fu0≧f≧fL0, the system determines that a change in the body temperature under monitoring is "standard." The system compares an integral amplitude A (average value) with a threshold value A0. Under the condition of A>A0, the system determines that a change in the body temperature under monitoring is "variational (or varying)." Under the condition of A≦A0, the system determines that a change in the body temperature under monitoring is "maintained (stable)."

When "blood pressure" is used as a biological condition parameter, the system computes a center frequency (or peak frequency) f for blood pressure waveforms detected by the blood pressure sensor 524 and an average value A of integral amplitudes A1 and A2 for the sections. When the frequency f is larger than the upper bound threshold value fu0, the system determines that a change in the blood pressure under monitoring is "sudden." When the frequency f is smaller than the lower bound threshold value fL0 (>fu0), the system determines that a change in the blood pressure under monitoring is "slow." Under the condition of fu0≧f≧fL0, the system determines that a change in the blood pressure under monitoring is "standard." The system compares an amplitude A with a threshold value A0. Under the condition of A≦A0, the system determines that the average blood pressure level under monitoring is "maintained." Otherwise, the system determines that the average blood pressure level under monitoring is "variational." When the change of the detected blood pressure value is sudden and "variational," the mental condition can be assumed to be "distraction." When the blood pressure varies slowly, the physical condition can be assumed to be poor. When the blood pressure varies suddenly, the condition can be assumed to be "excitation (anger)."

When "skin resistance" is used as a biological condition parameter, the system uses the skin resistance sensor 545. Similarly, the system samples skin resistance values and records the values as a waveform. The system computes a center frequency (or peak frequency) f for the spectrum and integral amplitudes A1 and A2 for the sections. The system plots integral amplitude A for the sections with reference to time t and performs a least-square regression to find gradient $\alpha$. When the frequency f is larger than the upper bound threshold value fu0, the system determines that a change in the skin resistance under monitoring is "sudden," When the frequency f is larger than the lower bound threshold value fL0 (>fu0), the system determines that a change in the skin resistance under monitoring is "slow." Under the condition of fu0≧f≧fL0, the system determines that a change in the skin resistance under monitoring is "standard." Further, the system compares an absolute value for the gradient a with threshold value $\alpha 0$. Under the condition of $|\alpha|\leq\alpha 0$, the system determines that a level of the skin resistance under monitoring is "constant." When $|a|>\alpha 0$ and the sign for a is positive, the system determines that the level of the skin resistance under monitoring is "increasing." When $|\alpha|>\alpha 0$ and the sign for $\alpha$ is negative, the system determines that the level of the skin resistance under monitoring is "decreasing." When a change in the detected skin resistance value is sudden and "increasing," the mental condition can be assumed to be "distraction." A slightly poor physical condition hardly affects a chronological change of the skin resistance. When a poor physical condition progresses, however, a change in the skin resistance value gradually increases. The skin resistance is useful for estimation of "serious physical condition." When a skin resistance value decreases suddenly, the condition of "excitation (anger)" can be considerably accurately estimated.

When "attitude" is used as a biological condition parameter, the system uses an attitude signal from the multiple seating sensors 520 embedded in the seat. The system computes a center frequency (or peak frequency) f for attitude signal waveforms, average value An of integral amplitudes A1 and A2 for the sections, and variance $\Sigma^2$. When the frequency f is larger than the upper bound threshold value fu0, the system determines that a change speed of the attitude under monitoring is "increasing." When the frequency f is smaller than the lower bound threshold value fL0 (>fu0), the system determines that a change speed of the attitude under monitoring is "decreasing." The system compares the average value An of integral amplitudes A with a predetermined threshold value and determines an attitude change amount to be "small," "slight increase," and "sudden increase." When an average value An is large, the attitude change amount tends to increase. When a value of variance $\Sigma^2$ is greater than or equal to a threshold value, the system determines that the attitude change amount tends to increase. Attitude changes indicate remarkably different tendencies depending on basic states to be specified such as "poor physical condition," "distraction," and "excitation." This parameter is particularly useful for distinguishing these states from each other. When the physical condition is normal, the users while driving, maintains a sense of tension needed for driving by appropriately keeping his or her attitude. When a poor physical condition occurs, however, a gesture for changing the attitude becomes marked to lessen the stress. The attitude change amount tends to slightly increase. When the poor physical condition further progresses or the user feels very sleepy, the attitude becomes unstable to shake. The attitude change amount tends to increase and decrease. Because the attitude change at this time is uncontrollable and unstable, a speed of the attitude change decreases considerably. In case of the distraction, the attitude change increases and decreases loosely, Since the body can be controlled, a difference is seen in that the attitude change speed does not decrease considerably. In case of the excitation, the user becomes restless and nervous. The attitude change increases rapidly. The change speed becomes high.

When "line-of-sight angle" is used as a biological condition parameter, the system specifies a pupil position and a face center in the face image. In addition, the system computes a deviation of the pupil from the face center in the front direction to find line-of-sight angle θ and acquire its chronological change waveform. Similarly, the system computes a center frequency (or peak frequency) f for waveforms, average value An of integral amplitudes A1 and A2 for the sections, and variance $\Sigma^2$. When the frequency f is larger than the upper bound threshold value fu0, the system determines that a change speed of the line-of-sight angle $\theta$ under monitoring is "increasing." When the frequency f is smaller than the lower bound threshold value fL0 (>fu0), the system determines that a change speed of the line-of-sight angle $\theta$ under monitoring is "decreasing." Under the condition of fu0$\geq$f$\geq$fL0, the system determines that a change speed of the line-of-sight angle $\theta$ under monitoring is "normal." The system compares the average value An of integral amplitudes A with a predetermined threshold value and determines a change amount of line-of-sight angle $\theta$ to be "small," "slight increase," or "sudden increase." When the average value An is large, the change amount of line-of-sight angle $\theta$ tends to increase. When a value of variance $\Sigma^2$ for A is greater than or equal to a threshold value, the system determines that the change of the line-of-sight angle $\theta$ tends to increase. That is, the system determines that the condition is "out of order" characterized by shifty eyes. In case of the distraction, a change amount of the line-of-sight angle $\theta$ increases rapidly and the eyes rove. Accordingly, the change amount is an important determining factor to estimate the distraction. In case of the poor physical condition, the line-of-sight change amount decreases in accordance with a degree of the poor physical condition. Accordingly, the change amount is an important determining factor to estimate the poor physical condition. The line-of-sight change amount decreases in case of the excitation. In case of the poor physical condition, when a change occurs in a visual range, it is difficult for the line-of-sight to follow the change, and the line-of-sight change speed decreases. In case of the excitation, the user immediately responds to and stares at a change in a visual range. The line of sight sometimes changes at a very high speed. The poor physical condition and excitation can be distinguished.

When "pupil diameter" is used as a biological condition parameter, the system uses the iris camera 527 (FIG. 1) to capture an iris of the user. The system determines a pupil diameter d in the image and acquires its chronological change waveform. From the waveform, the system computes an average pupil diameter dn for the sections, average value An of integral amplitudes A1 and A2 for the sections, and variance $\Sigma^2$ When the average pupil diameter dn is larger than threshold value d0, the system recognizes "open pupil." When the average pupil diameter dn is not larger than threshold value d0, the system checks whether or not the variance $\Sigma^2$ is larger than threshold value $\Sigma^2$0. When the variance $\Sigma^2$ is larger than threshold value $\Sigma^2$0, the system recognizes "varying pupil diameter." When the variance $\Sigma^2$ is not larger than threshold value $\Sigma^2$0, the system recognizes "normal condition." The pupil diameter d remarkably varies with the mental condition of the user. The system can highly accurately estimate whether or not the user is excited based on whether or not the pupil is opened specifically. When the pupil diameter varies, the system can recognize the distraction.

When "steering operation state" is used as a biological condition parameter, the system samples and evaluates the steering operation during linear running. Specifically, the system reads a current steering angle $\phi$ that is output from a steering angle sensor at sampling timings based on a specified time interval. A deflection angle is defined as being left or right from $\phi$=0 degrees indicating that the steering wheel is neutral to drive the vehicle straight. For example, a rightward angle is defined as being positive, and a leftward angle is defined as being negative. The system acquires the steering angle as a waveform and computes a center frequency (or peak frequency) f, integral amplitudes A1 and A2 for the sections, and variance $\Sigma^2$. When the frequency f is larger than the upper bound threshold value fu0, the system determines that a change speed of the steering angle $\phi$ is "increasing." When the frequency f is smaller than the lower bound threshold value fL0 (>fu0), the system determines that a change speed of the steering angle $\phi$ is "decreasing." Under the condition of fu0$\geq$f$\geq$fL0, the system determines that a change speed of the steering angle $\phi$ is "normal." When the variance $\Sigma^2$ of the integral amplitude A is larger than the threshold value $\Sigma^2$0, the system determines that a steering error is "increasing." When the variance $\Sigma^2$ is not larger than the threshold value $\Sigma^2$0, the system determines that a steering error is "normal." By detecting an increasing steering error, the system can estimate that the driver is distracted or excited. A normal steering operation is hindered when a seriously poor physical condition occurs including a sleepy state. This situation can be estimated according to the tendency of an increasing steering error. A poor physical condition or a decreased concentration tends to slow down a response to the steering operation. This situation can be estimated according to a decreased steering speed. The user, when excited and irritated, tends to make a sharp turn. This situation can be estimated according to an increased steering speed.

By use of the determination results of time changes of the obtained biological condition parameters, the main ECU 100 actually determines (estimates) a mental or physical condition of the user. Concretely, the main ECU 100 stores a determination table 1601 as shown in FIG. 7. The determination table 1601 stores combinations of multiple specified conditions and chronological changes of the biological condition parameters in association with each other. The user needs to determine each specified condition as a combination of mental and physical conditions. The sensors of the biological information acquisition unit 501 requires detecting the biological condition parameters so that each of the specified conditions is satisfied. The determination table 1601 also stores values of a physical condition index PL and a mental condition index SL corresponding to each biological condition. The applicable biological condition $\epsilon$ can be also specified by combining these indexes.

The embodiment defines the specified conditions such as "normal," "decreased concentration," "poor physical condition," "excitation," and "disappointment." The "poor physical condition" is divided into multiple levels, for example two levels such as "slightly poor physical condition" and "seriously poor physical condition" according to the embodiment. The "decreased concentration" and "excitation" can be divided into multiple levels so as to more finely estimate a biological condition. The embodiment uniquely specifies combinations of chronological change states of the biological condition parameters corresponding to a composite state of the basic specified conditions related to physical and mental conditions for improving the accuracy of estimating the composite state. The user may feel some kind of unpleasantness due to an inapplicable, insufficient, or excessive hospitality operation. In such case, the user may often indicate a biological condition similar to a slightly poor physical condition. The embodiment integrates the "unpleasantness" and the "slightly poor physical condition" into the specified condition. Obviously, both may be specified separately by changing threshold values for the configuration of associated parameters.

The determination table 1601 indicates examples of setting values for the physical condition index PL and the mental condition index SL corresponding to each specified condition. Each index is defined as a numeric value within a given range having a maximum value ("10" in this example) and a minimum value ("0" in this example). The physical condition index corresponding to "normal" is assigned the maximum value ("10" in this example) of the numeric range. A smaller value indicates a less physical condition. On the other hand, the mental condition index SL corresponding to "normal" is assigned an intermediate value of the numeric range. The intermediate value indicates mentally "stable" or "moderate" and is set to "5" in this example. The intermediate value is not limited to a central value. A value toward to the maximum value indicates an "elevated or excited" state. A value toward to the minimum value indicates a "depressed or disappointed" state.

According to the determination table 1601, the decreased concentration tends to rapidly increase an expression change. The poor physical condition or excitation tends to increase an expression change. In either case, it is possible to identify a state different from the normal state but difficult to identify each mental or physical condition in detail. With respect to body temperature states, the decreased concentration indicates little change (i.e., almost equal to the normal state). The poor physical condition indicates a slight change. The excitation indicates a rapid change. Accordingly, combining both can independently identify "decreased concentration," "poor physical condition," and "excitation."

Basically, the system collates information to be collated in the determination table with multiple biological condition parameters (two parameters of expression and body temperature in this example). The system performs a process of specifying a specified condition corresponding to the collated combination as the currently satisfied specified condition. That is, the system reads a determination result (such as "rapid decrease" or "increase") about chronological changes in the biological condition parameters. To determine that each specified condition is satisfied, the system collates the determination result with the information to be collated that represents a preferable change tendency of each biological condition parameter in the determination table 1601. The system increments a collation counter for the specified condition that matches the information to be collated with the determination result. In this case, for example, the system may process all the biological condition parameters to determine only a specified condition that matches the information to be collated with the determination result. When many biological condition parameters are referenced, the information to be collated rarely matches the determination result with respect to all the biological condition parameters. It is difficult to flexibly estimate the physical or mental condition of the user. As an effective method, a collation counter generates a score (N). The score is assumed to be a "degree of coincidence." The specified condition is settled when it shows the highest score, that is, the largest degree of coincidence.

When an average blood pressure level is determined to be "variational," the state of the same biological condition parameter may positively contribute to establishment of multiple specified conditions such as "distraction" or "excitation." In this case, the process increments the collation counters for the specified conditions. When an average blood pressure level is determined to be "variational," for example, the process increments four collation counter values N1, N4, N5, and N6.

As mentioned above, a match or a mismatch between the information to be collated and the determination result is mostly based on the comparison with the threshold value for the biological condition parameter such as a frequency or an amplitude. When a match or a mismatch is determined on a two-valued or black-or-white basis as mentioned above, such determination nullifies information about a difference between the actual parameter value and the threshold value. Actually, the determination may be "gray" when a match or a mismatch is determined based on a value approximate to the threshold value. Such determination is contrasted with the determination of a match or a mismatch based on a value greatly different from the threshold value. The former determination is requested to moderately contribute to the determination result.

A method to solve this problem substitutes for the method of incrementing the collation counter only when the information to be collated completely matches the determination result. A determination result may not show the complete match but may approximate to the match within a specified range. Such result is limited to a score smaller than the complete match. The score is added to the collation counter. When the information to be collated indicates "sudden increase," the determination adds three points when also indicating "sudden increase," two points when indicating "increasing," or one point when indicating "slight increase," for example.

When the character and the biological condition of the user sitting on each seat are determined, the main ECU 100 transmits this information to the audio ECU 200. Proceeding to S102, the audio ECU 200 specifies the current music replay mode. The audio ECU 200 performs a process of selecting and replaying music (S103 and S104) in the specified replay mode.

Figure 9:
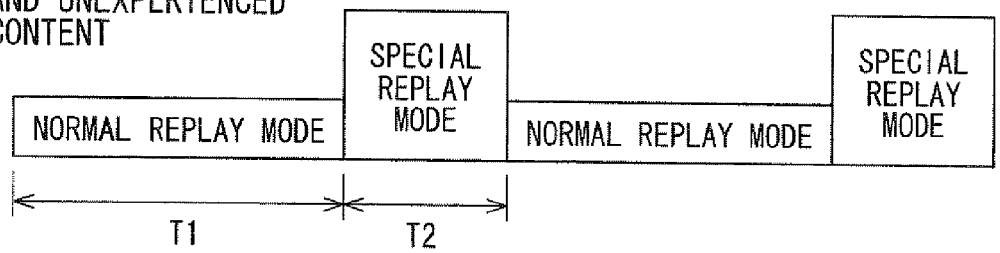
FIG. 9 shows a sequence that shortens a special replay mode period for replaying an unexperienced content compared to a normal replay mode period.

As shown in FIG. 6, the music replay history database 202 collects and records music selection (replay history) data concerning each user-selected music source data according to characters and applicable biological conditions as well as the information about degrees of conformity. The system references music selection (replay history) data corresponding to the user's character and biological condition specified as mentioned above. The system can immediately recognize how many times the user replayed what song or what degree of conformity the user indicated as a feedback. The music replay mode is changed between special replay mode (S103) and normal replay mode (S104). The special replay mode periodically and preferentially replays an unexperienced content or music source data that shows a user-generated replay history short of a predetermined threshold count or especially shows no replay history in the past. The normal replay mode replays only precedented music source data having a specified replay history or more or sequentially replays a group of music source data manually selected by the user. A known technique can measure a period using an unshown timer. As shown in FIG. 9, a continuation time (or the number of successively replayed songs) for the normal replay mode is configured to be longer than a continuation time (or the number of successively replayed songs) for the special replay mode. Specifically, the special replay mode replays only one or up to three successive songs of music source data whose replay history is smaller than the threshold count. The normal replay mode successively replays precedented music source data during a period twice to 50 times longer than that in the special replay mode.

Except manual selection of songs, either mode selects songs corresponding to the music source data in the order of degrees of conformity for the user from the music replay history database 202. In FIG. 6, the special replay mode first retrieves an unexperienced content that indicates no music selection (marked with "x") and a degree of conformity greater than or equal to a specified value. The example evaluates the degree of conformity on a ten-point scale. A larger value such as 8 or more indicates an excellent degree of conformity. When multiple unexperienced contents are retrieved, they are sorted in the descending order of degrees of conformity. When the unexperienced contents are finished, the special replay mode then selects songs from less frequent contents. The less frequent content represents music source data marked with "Δ" whose replay history equals a threshold count (2 in this example) or less. The contents are sorted in the descending order of degrees of conformity. The sort result can be stored as a special replay mode list. Obviously, it is possible to select only unexperienced contents.

Figure 11:
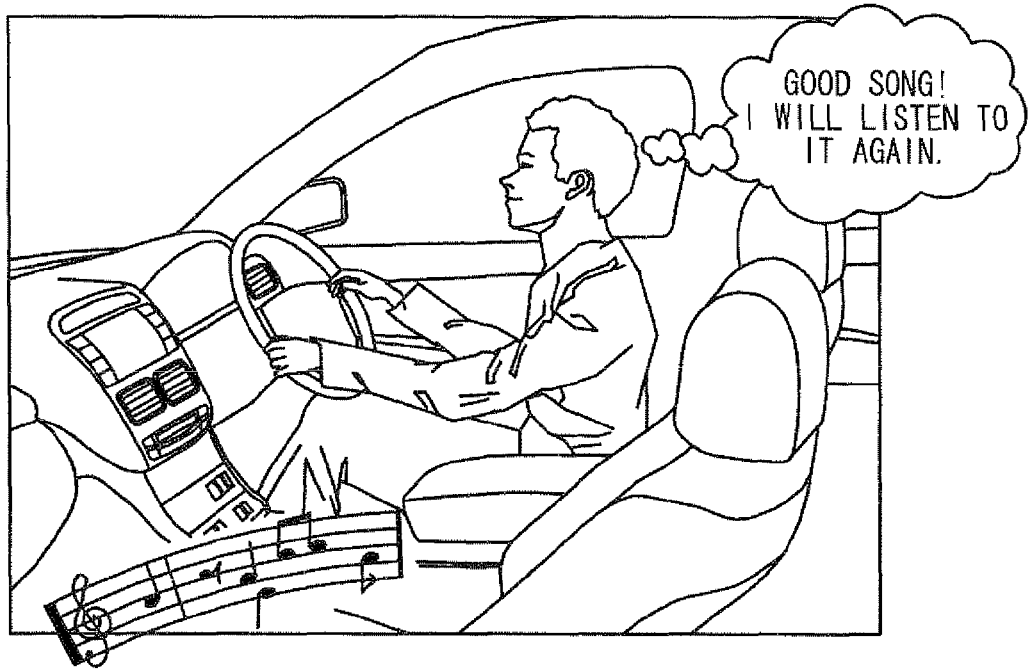
FIG. 11 illustrates an effect of playing an unexperienced content.

The special replay mode sequentially selects songs from the special replay mode list for replay. For example, let us suppose that a specified user indicates character "D" and biological condition ε. The system extracts music source data provided with character type D and applicable biological condition ε from FIG. 4. The system references the raw data 202A in the music replay history database 202 in FIG. 5. The system collects music selections performed by the user for each song and generates the user-based replay history data 2028 in FIG. 6. Specifically, the system can extract ID2, ID7, and ID8 assigned with the degree of conformity 10 and ID5 and ID10 assigned with the degree of conformity 8 as the music source data that is assigned with the degree of conformity 8 or larger and indicates no music selection (marked with x). In particular, the music source data ID2, ID7, and ID8 indicate the maximum value of the degree of conformity with the user's character and the current biological condition ε. In addition, the music source data ID2, ID7, and ID8 are unexperienced contents indicating no replay history. Such contents are played while randomly inserted into a successive play of known songs marked with the replay history. As shown in FIG. 11, the user can actually feel freshness and emotion about an unknown song with a strong impact and would really like to listen to that song again. To encounter a good song, the user needed to actively listen to many songs inefficiently. The above-mentioned system can positively assist the user to find an unknown good song for the user so that he or she would really like to listen to the song again.

When an unexperienced content is not retrieved, the system can retrieve and output music source data that has the replay history, was less frequently replayed in the past, and indicates as high a degree of conformity with the user state as possible. As will be described later, the system can also download and replay an unexperienced content as needed from a content provision center outside the vehicle.

Figure 14:
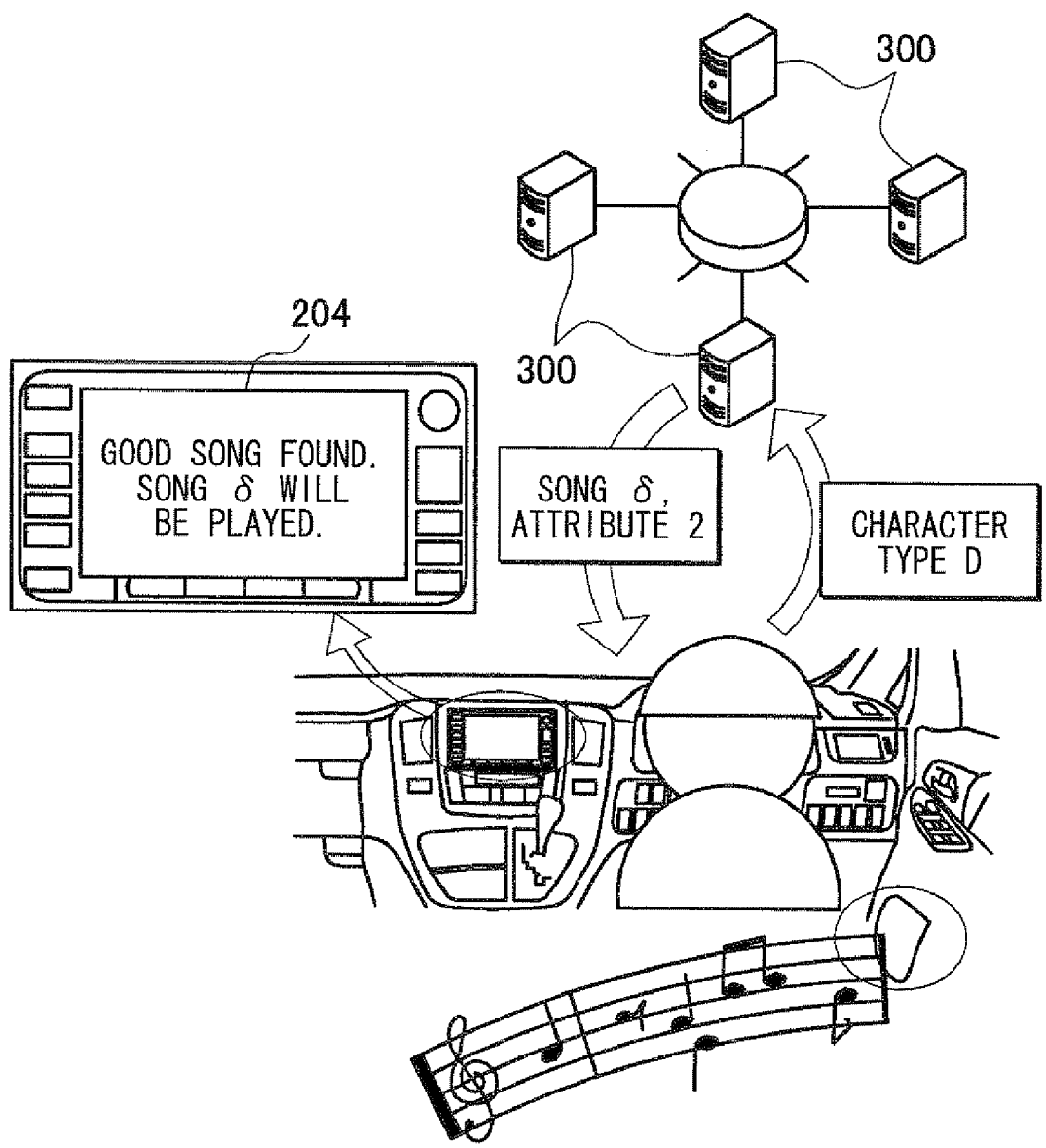
FIG. 14 illustrates a working effect of the vehicular music replay system.

The system can automatically select and replay songs sequentially in the descending order from the special replay mode list. In this case, the system automatically replays songs unknown to the user independently of the user's intention to select songs. When a song named "δ" is selected, the monitor 204 can display this information prior to the replay as shown in FIG. 14. The system can audibly output the same information using speech data in a speech data module 205 in FIG. 1. The audio hardware 206 can be used for this purpose. The display and the speech output are available after the end of the song. The display can continue while the song is replayed. In this manner, the user can early recognize the name (or other information such as players for specifying songs) of a song that is new to the user but motivates him or her to listen again. The system can appropriately provide the user with the helpful information for succeeding active listening.

Figure 10:
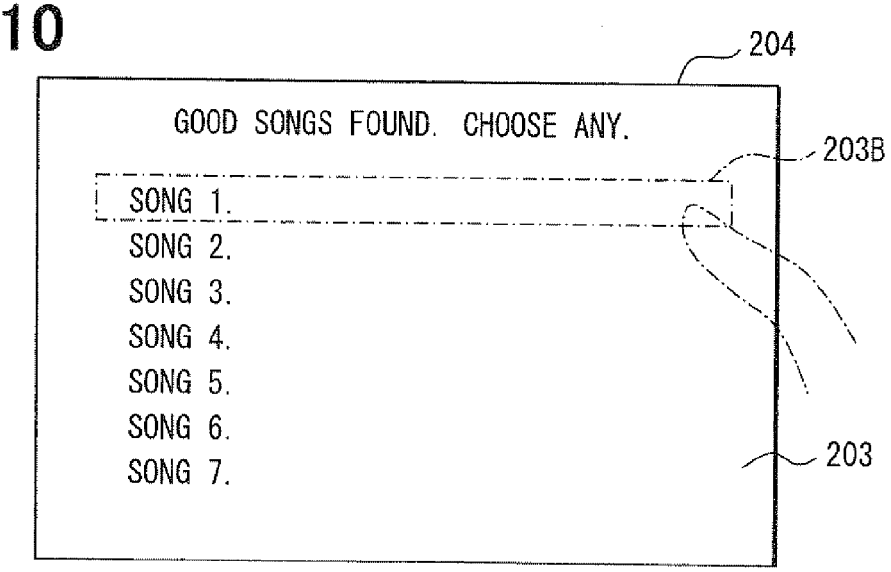
FIG. 10 shows an example of a screen for selecting and playing an unexperienced content.

On the other hand, the system can use the monitor 204 to once display a song in the special replay mode list as shown in FIG. 10 and allow the user input for selecting the song. FIG. 10 shows the special replay mode list of songs corresponding to FIG. 6. A title display area for each song functions as the software button 203B on the touch panel 203. The user can touch the software button 203B to directly select the song.

The above-mentioned process retrieves only the music source data provided with the corresponding applicable biological condition in consideration for not only the user character but also the current biological condition. Accordingly, the system provides the music applicable to not only the user's character and preference but also the user's present mental or physical condition and may further increase the user's emotion. As shown in FIG. 9, the biological condition in the first special replay mode may change to the biological condition in the next special replay mode. For example, the first biological condition "excitation" may change to "distraction" due to tiredness. In such case, the selection contents of the special replay mode list correspond to the biological condition after the change. The system can always provide music sources appropriate to varying biological conditions.

Favorite songs may be relatively constant independently of biological conditions. To broaden song selections, for example, songs can be retrieved in a wider range only according to the user's character without narrowing a retrieval result in accordance with the present biological condition.

The normal replay mode concerns music source data that is stored in the music replay history database 202 and is not replayed in the special replay mode. Namely, the music source data available in the normal replay mode is neither an unexperienced content nor a less frequent content. The normal replay mode can select such music source data in the descending order of degrees of conformity with the user. In this case, the user's biological condition need not be specified. The biological information acquisition unit 501 can be omitted.

When the music is replayed, the system evaluates the degree of conformity between the music and the user. For example, the degree of conformity can be evaluated by detecting whether or not the user changes the currently played song to another possibly because the former is unacceptable. Another evaluation compares the user's expression during the play or the user's biological condition immediately after the play with the user's biological condition after the play. When the biological condition changes to neutral or appropriate excitation, the song can be evaluated to be applicable (or acceptable). When the biological condition changes toward "unpleasantness," the song can be evaluated to be inapplicable (or unacceptable). For example, this evaluation can be quantified depending on whether the mental condition index (FIG. 7) changes to be better or worse. As shown in FIG. 6, the degrees of conformity can be represented in numeric values.

Figure 12:
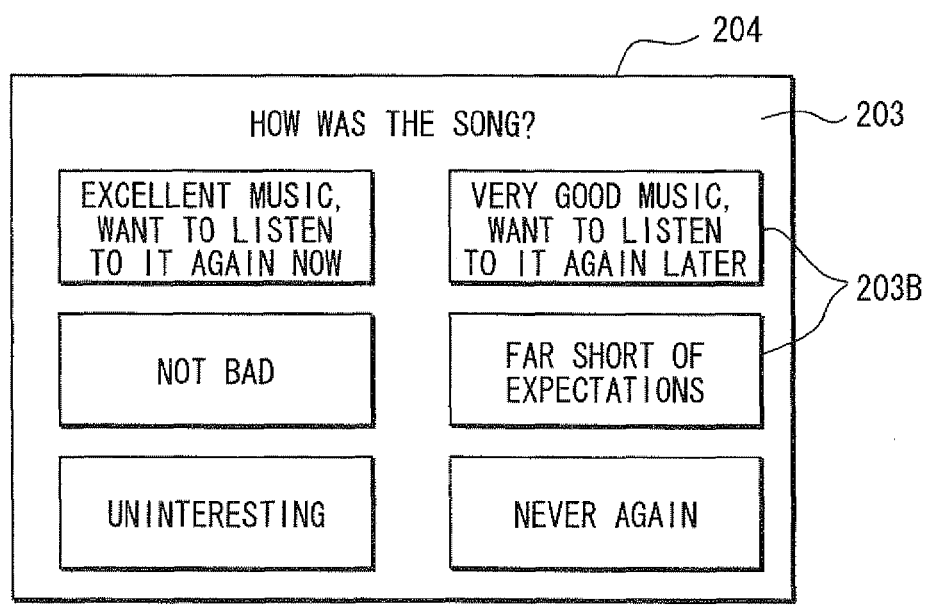
FIG. 12 shows an example of an interface for evaluating the degree of conformity about an unexperienced content.

A simpler method of quantifying the degree of conformity is to allow the user to directly input an evaluation result. As shown in FIG. 12, for example, evaluation items are graded and are assigned with numeric values indicating the degrees of conformity. For example, value 10 denotes "excellent music, want to listen to it again now;" 8 denotes "very good music, want to listen to it again later;" 6 denotes "not bad;" 4 denotes "far short of expectations;" 2 denotes "uninteresting;" and 0 denotes "never again." The monitor 204 displays a screen for selecting the evaluation items so that the user can select an item using the software button 203B. In this case, selecting the evaluation item enters the numeric value corresponding to the degree of conformity.

When the degree of conformity is evaluated, the system uses the value for the degree of conformity based on the new evaluation to correct the value for the degree of conformity already assigned to the corresponding music source data as shown in FIG. 6. Various correction methods are available such as replacing (overwriting) the old degree of conformity with the new degree of conformity or providing a new degree of conformity by finding a weighted average between the new and old degrees of conformity.

The above-mentioned embodiment selects songs from the music source database provided for the car in which the user gets. Provision of the above-mentioned effect requires storing a certain amount of unexperienced contents for the user. To solve this problem, an external server can be used as a distributor database for unexperienced contents. An unexperienced content can be downloaded from the external server as needed to satisfy the user even when the music source database 201 on the car is not so enriched or most of the music source data is already replayed. In this case, the music source database 301 (distributor database) of the content information provision center 300 in FIG. 1 can be used as the distributor database for unexperienced contents. The music source database 301 has the same data structure as that of the music source database 201 in FIG. 4.

It should be noted that music source data applicable to the user can be retrieved from the music source database 301 when the content information provision center 300 acquires a user state (character or biological condition) from the car. However, the user eventually needs an unexperienced content specific to the user, i.e., music source data not stored in the music source database 201 of the car. There is a need for a means that links the content information provision center with the car to retrieve unexperienced contents out of the music source data applicable to user states from the music source database 301 (distributor database) of the content information provision center 300.

Figure 13:
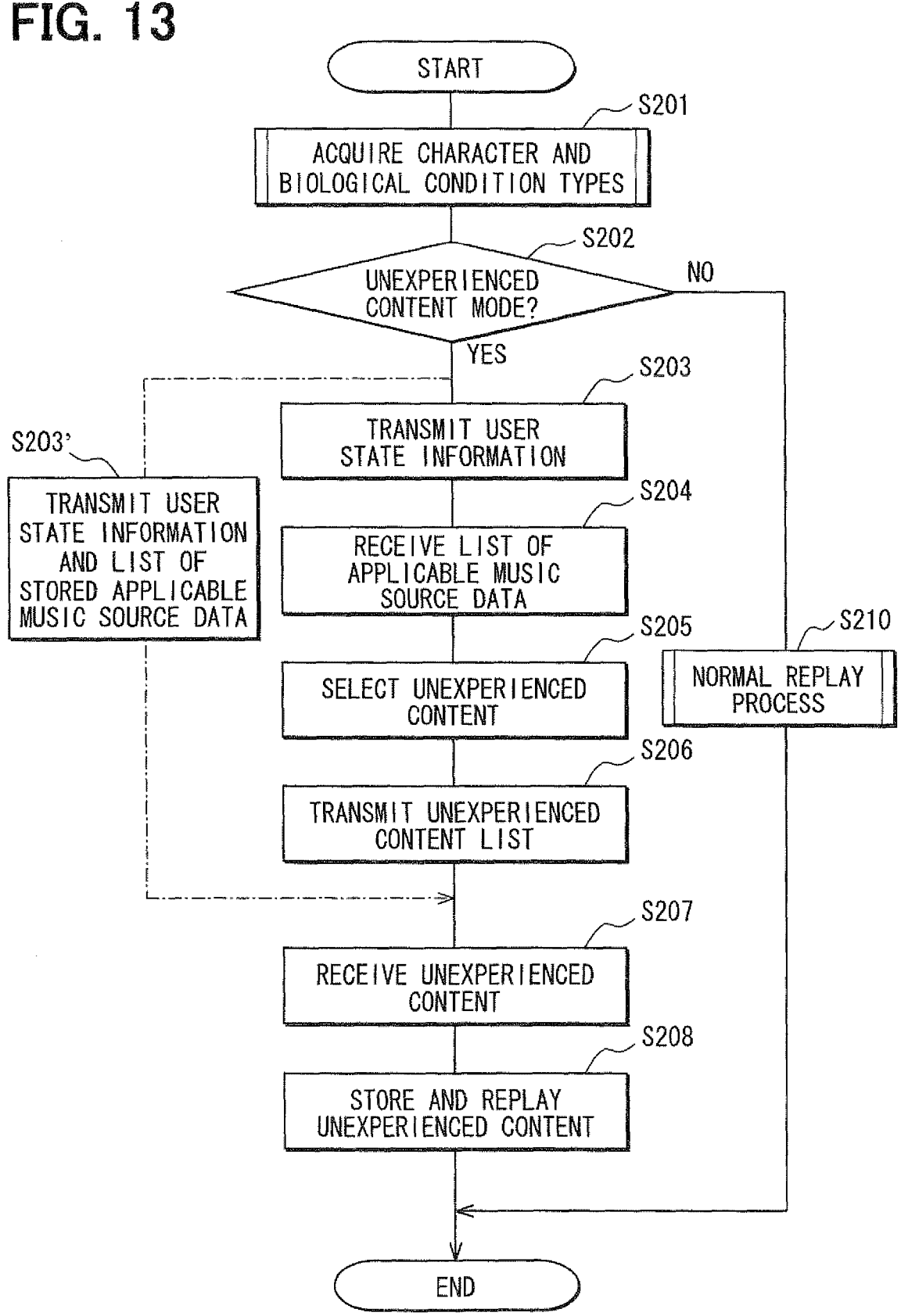
FIG. 13 is a flow chart showing a second example of an operation process of the vehicular music replay system in FIG. 1.

FIG. 13 is a flow chart showing the process flow in this case. Processes at S201, S202, and S204 are completely the same as those at S101, S102, and S104 in FIG. 8. When the special replay mode is currently enabled at S202, the process transmits the user state information (character code and biological condition) to the content information provision center 300 (S203). The content information provision center 300 searches the music source database 301 for music source data applicable to the user state information independently of whether the music source data is an unexperienced content or not. The content information provision center 300 generates a list of specification information (i.e., the music source database except the song data in FIG. 4) about matching music source data and returns the list to the car.

The car receives the list (S204). There may be music source data that is not stored in the music source database 201 of the car. The system selects the specification information about such music source data as an unexperienced content (S205). The system lists a selection result and transmits it to the content information provision center 300 (S206). The content information provision center 300 reads an unexperienced content corresponding to the specification information in the received list from the music source database 301 and returns the content to the car. The car receives the content using a new music source data download means (S207) and replays the content (S208).

The received unexperienced content may be additionally stored in the music source database 201 or may be just replayed in a streaming fashion and not additionally stored in the music source database 201. For example, the former case may be charged and the latter not. For example, the system can deliver a demo version of the targeted unexperienced content from the content information provision center 300 in a streaming fashion free of charge. The demo version signifies a partial version such as a shortened version for promotion or an edited version containing only the first verse and a low-quality version created at a high compression rate, for example. When the user in the car likes the demo version, he or she can enter data for purchasing and downloading the full version from the input section 203 in exchange for the charge.

As indicated by a dash-dot line in FIG. 13, the system may transmit, to the content information provision center 300, not only the user state information from the car but also a list of music source data that is already stored in the music source database 201 of the car and is applicable to the user state (S203'). The content information provision center 300 searches the music source database 301 for music source data that is applicable to the user state information and is not contained in the transmitted list. The content information provision center 300 can also return such music source data as an unexperienced content to the car (S207). Since the content information provision center 300 selects an unexperienced content, the car can immediately download the unexperienced content without the selection and the list transmission at S205 and S206.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As an aspect of the disclosure, a vehicular music replay system is provided as follows. A music replay and output means is included in a vehicle (including a car) for replaying music or a music source based on selected music source data. A storage medium is included to have a music source database for storing the music source data individually in association with applicable user state data reflecting a user state containing at least a user character, a mental condition, and a physical condition applicable to a music content replayed by each music source data. A music replay history recording means is included for recording a replay history of each of the music source data. A user state specification means is included for specifying a current user state of the user in the vehicle. An unfamiliar source retrieval means is included for searching the music source database for music source data provided with applicable user state data corresponding to the specified user state so as to provide a higher retrieval priority for a lower replay history by referencing the replay history. An unfamiliar source replay control means is included for selecting music source data to be replayed from the music source database based on a retrieval result by the unfamiliar source retrieval means and allowing the music replay and output means to replay the selected music source data.

The vehicular music replay system stores music sources to be replayed in music source databases in association with applicable user state data reflecting a user state containing at least one of a user character, mental condition, and physical condition. The system retrieves a music source corresponding to the current user state acquired in a vehicle. During the retrieval, a higher retrieval priority is provided for a music source having a lower replay history in the past. The system can intensively retrieve music sources that are applicable to the current user state and are hardly familiar to the user memory. The system can select songs based on a retrieval result, allow even a first or unfamiliar music source to be felt suited for the user, and consequently enhance an emotion about encounter with an unknown music source.

As an optional aspect, the vehicular music replay system can be provided with a user specification means for specifying a user in the vehicle. The music replay history recording means can record a replay history of the music source data for each user. The unfamiliar source retrieval means can reference a replay history record about a user specified by the user specification means and search the music source database for music source data corresponding to a user state of the user so as to provide a higher retrieval priority for a lower replay history. Even when different users use the same vehicle, the system records a replay history of music source data for each of the users. The system can appropriately determine a music source unfamiliar to the user. The effect is equally available to different users.

As an optional aspect, the unfamiliar source retrieval means can search the music source database for unfamiliar source data, namely music source data whose predetermined replay history about a user is smaller than a threshold count. The unfamiliar source replay control means can allow the music replay and output means to replay at least any one of pieces of retrieved unfamiliar source data. The system can intensively select and replay music sources whose replay counts are less than a threshold value, making it possible to further enhancing an emotion concerning encounter with a new music source. The unfamiliar source retrieval means may search the music source database for the unfamiliar source data in terms of an unexperienced content that is music source data having no replay history by a user in the past. The above-mentioned effect becomes remarkable when the unfamiliar source replay control means allows the music replay and output means to replay retrieved unplayed source data. The user can listen to a music source that is not only suited for his or her condition but also is new to him or her. The latter is a decisive factor that can cause an ad hoc emotion. The user may be addicted to such possibility afterwards.

As an optional aspect, the unfamiliar source replay control means can be configured to automatically replay retrieved unfamiliar source data. When the user is not mentally prepared for an unfamiliar music source and positively enjoys it dependently on the system, the user may be given a strong impact on emotion concerning an unexperienced music source that is suddenly replayed. A better effect may be expected. In this case, it is preferable to provide the automatic content notification means for visually or audibly notifying the user of an automatically replayed content prior to automatic replay of the unfamiliar source data so that the user can find a clue to listening to the music source later again. When the user happens to listen to an unknown music source broadcast in a radio program, an explanation about the music by a narrator or a disc jockey prior to the play may be convenient for the user. The user as a listener can avoid uneasiness at the unknown music source though it is good. As another case, the user may turn on the radio during play of a song and may like that song. In such case, it may be preferable to again broadcast the song name, singer, or player after the end of the song. The user can be satisfied with the information about the song and tempted to listen to that song again. A similar effect is contrasted with the former case and can be provided by visually or audibly notifying the user of the automatically played content after the end of the automatic replay of the unfamiliar source data.

As an optional aspect, without being limited to the above-mentioned automatic play, the following manual selection of songs can be provided. That is, the unfamiliar source retrieval result output means and the selective input means may be provided. The unfamiliar source retrieval result output means outputs and displays a retrieval result generated by the unfamiliar source retrieval means. The selective input means allows the user to reference a content output by the unfamiliar source retrieval result output means and selectively input music source data to be replayed. The unfamiliar source replay control means is configured to replay the selectively input music source data. In some cases, the user may not dare to listen to an unknown music source. Such problem can be solved by starting the replay in response to a selective input by the user. This is convenient when multiple candidates for unfamiliar music source data are retrieved. The user can determine which candidate is to be replayed.

As an optional aspect, the applicable user state data can be associated with the music source data in the music source database and contains user biological condition data reflecting at least one of a mental condition and a physical condition of the user. The user state specification means can include a user biological condition monitoring means that detects and monitors user biological condition reflecting at least one of a mental condition and a physical condition of the user in the vehicle. The unfamiliar source retrieval means can search, upon request, the music source database for music source data applicable to a user biological condition being monitored. The longer the user stays in the vehicle, the more easily the user's biological condition (mental condition or physical condition) varies with the elapse of time. The above-mentioned construction can select music source data applicable to the user's varying biological condition and more effectively satisfy the user.

As an optional aspect, the applicable user state data can be associated with the music source data in the music source database and contain character specification data for specifying a character of the user. The user state specification means can include a character specification data means for acquiring character specification data about the user in the vehicle. The unfamiliar source retrieval means can search the music source database for music source data corresponding to acquired character specification data. This construction categorizes the user character into types and individually determines music source data applicable to the user of a given character type. On the other hand, the vehicle system specifies the character of the user who is currently using the vehicle. The vehicle system selects and provides music source data corresponding to the character. The selected song can match the user character. Users having different characters can be satisfied with appropriate music sources.

As an optional aspect, the vehicular music replay system can be further provided with: a degree-of-conformity evaluation means for evaluating a degree of conformity between the user state and a music source replayed based on the music source data; and an applicable user state data correction means for correcting a degree of conformity as a feedback corresponding to the replayed music source data in the music source database based on an evaluation result of the degree of conformity. The system evaluates how the actually provided music source data matches the currently detected user state. Based on an evaluation result, the system corrects the degree of conformity as a feedback corresponding to the music source data. The system can improve the validity of selecting songs later on in accordance with user states and accordingly a degree of satisfaction of the user.

As an optional aspect, the vehicular music replay system can further include: a manual song selection means for manually selecting any music source data in the music source database; a manual song selection and replay control means for allowing the music replay and output means to replay the manually selected music source data; a familiar source retrieval means for referencing a replay history recorded by the music replay history recording means and searching the music source database for precedented music source data, namely music source data that corresponds to a specified user state and has a replay history greater than or equal to a specified value; a familiar source replay control means for automatically selecting targeted music source data from the retrieved precedented music source data and allowing the music replay and output means to replay the music source data; and a selection and replay mode change means for periodically alternating a normal selection and replay mode enabled by the familiar source replay control means or the manual song selection and replay control means and a special selection and replay mode enabled by the unfamiliar source replay control means.

According to the above-mentioned construction, the system can alternate the normal selection and replay mode and the special selection and replay mode. The normal selection and replay mode replays precedented music source data that has already a replay history for the user. The special selection and replay mode is used for unfamiliar music source data. The system basically provides the user with familiar, favorite songs and intermittently replays unfamiliar (or new) songs to further increase an impact of the emotion. The duration of the normal selection and replay mode is configured to be longer than that of the special selection and replay mode. An unfamiliar (or new) song is replayed relatively less frequently. A newer emotion can be expected.

As an optional aspect, the music source database can include a vehicle database mounted on the vehicle and a distributor database that is provided outside the vehicle for enabling a wireless communication access from multiple vehicles and wirelessly delivers the music source data to the vehicle database. The vehicle can be provided with a new music source data download means for downloading, from the distributor database, music source data that corresponds to the specified user state and is not stored in the vehicle database. The user can acquire music source data that is applicable to a specified user state and is unknown to the user. Such music source data can be acquired from the outside of the vehicle as needed. The system can efficiently enrich new music source data that may cause an emotion.

As another aspect of the disclosure, a method is provided for controlling the above music reply system.

It will be obvious to those skilled in the art that various changes may be made in the above-described embodiments of the present invention. However, the scope of the present invention should be determined by the following claims.

What is claimed is:

1. A vehicular music replay system comprising:
   a music replay and output means provided in a vehicle for replaying music based on selected music source data;
   a storage medium including a music source database for storing the music source data individually in association with applicable user state data reflecting a user state containing at least a user character, a mental condition, and a physical condition applicable to a music content replayed by each music source data;
   a music replay history recording means for recording a replay history of each of the music source data;
   a user state specification means for specifying a current user state of the user in the vehicle;
   an unfamiliar source retrieval means for searching the music source database for music source data provided with applicable user state data corresponding to the specified user state so as to provide a higher retrieval priority for a lower replay history by referencing the replay history; and
   an unfamiliar source replay control means for selecting music source data to be replayed from the music source database based on a retrieval result by the unfamiliar source retrieval means and allowing the music replay and output means to replay the selected music source data.

2. The vehicular music replay system according to claim 1, further comprising:
   a user specification means for specifying a user in the vehicle,
   wherein the music replay history recording means records a replay history of the music source data for each user; and
   wherein the unfamiliar source retrieval means references a replay history record about a user specified by the user specification means and searches the music source database for music source data corresponding to a user state of the specified user so as to provide a higher retrieval priority for a lower replay history.

3. The vehicular music replay system according to claim 1, wherein the unfamiliar source retrieval means searches the music source database for, as unfamiliar source data, music source data having a replay history about a user smaller than a predetermined threshold count; and
   wherein the unfamiliar source replay control means allows the music replay and output means to replay at least any one of pieces of retrieved unfamiliar source data.

4. The vehicular music replay system according to claim 3, wherein the unfamiliar source retrieval means searches the music source database for the unfamiliar source data in terms of an unexperienced content that is music source data having no replay history by a user in past; and
   wherein the unfamiliar source replay control means allows the music replay and output means to replay retrieved unplayed source data.

5. The vehicular music replay system according to claim 3, wherein the unfamiliar source replay control means automatically replays retrieved unfamiliar source data.

6. The vehicular music replay system according to claim 5, further comprising:
   an automatic content notification means for notifying visually or audibly the user of a content of automatic replay prior to automatic replay of the unfamiliar source data.

7. The vehicular music replay system according to claim 1 further comprising:
   an unfamiliar source retrieval result output means for displaying a retrieval result generated by the unfamiliar source retrieval means; and
   a selective input means for allowing the user to reference a content output from the unfamiliar source retrieval result output means and selectively input music source data to be replayed,
   wherein the unfamiliar source replay control means replays selectively input music source data.

8. The vehicular music replay system according to claim 1, wherein the applicable user state data is associated with the music source data in the music source database and contains user biological condition data reflecting at least one of a mental condition and a physical condition of the user;
   wherein the user state specification means includes a user biological condition monitoring means that detects and monitors user biological condition reflecting at least one of a mental condition and a physical condition of the user in the vehicle; and wherein the unfamiliar source retrieval means searches, upon request, the music source database for music source data applicable to a user biological condition being monitored.

9. The vehicular music replay system according to claim 1, wherein the applicable user state data is associated with the music source data in the music source database and contains character specification data for specifying a character of the user;

wherein the user state specification means includes a character specification data means for acquiring character specification data about the user in the vehicle; and wherein the unfamiliar source retrieval means searches the music source database for music source data corresponding to the acquired character specification data.

10. The vehicular music replay system according to claim 1, further comprising:

a degree-of-conformity evaluation means for evaluating a degree of conformity between the user state and a music source replayed based on the music source data; and an applicable user state data correction means for correcting a degree of conformity as a feedback corresponding to the replayed music source data in the music source database based on an evaluation result of the degree of conformity.

11. The vehicular music replay system according to claim 1, further comprising:

a manual song selection means for manually selecting any music source data in the music source database;

a manual song selection and replay control means for allowing the music replay and output means to replay the manually selected music source data;

a familiar source retrieval means for referencing a replay history recorded by the music replay history recording means and searching the music source database for precedented music source data that corresponds to a specified user state and has a replay history greater than or equal to a specified value;

a familiar source replay control means for automatically selecting targeted music source data from the retrieved precedented music source data and allowing the music replay and output means to replay the music source data; and a selection and replay mode change means for periodically alternating (i) a normal selection and a replay mode enabled by the familiar source replay control means or the manual song selection and replay control means and (ii) a special selection and replay mode enabled by the unfamiliar source replay control means.

12. The vehicular music replay system according to claim 1, wherein the music source database includes a vehicle database provided in the vehicle and a distributor database that is provided outside the vehicle for enabling a wireless communication access from a plurality of vehicles and wirelessly delivers the music source data to the vehicle database; and wherein the vehicle is provided with a new music source data download means for downloading, from the distributor database, music source data that corresponds to the specified user state and is not stored in the vehicle database.

13. A method for replaying music in a vehicle, the method comprising:

storing music source data including a plurality of music sources, each music source being in association with applicable user state data reflecting a user state containing at least a user character, a mental condition, and a physical condition applicable to a music content replayed by the each music source;

recording a replay history of each of the music sources;

specifying a current user state of the user in the vehicle;

searching the music source database for a music source provided with applicable user state data corresponding to the specified user state so as to provide a higher retrieval priority for a lower replay history by referencing the replay history;

selecting a music source to be replayed from the music source database based on a result from the searching the music source database; and replaying the selected music source.

* * * * *